(12) United States Patent
Frei et al.

(10) Patent No.: US 6,708,096 B1
(45) Date of Patent: Mar. 16, 2004

(54) METHOD FOR CONTROLLING AN ELEMENT OF A DRIVE TRAIN OF A VEHICLE AND CONTROL UNIT FOR PERFORMING SAID METHOD

(75) Inventors: Rasmus Frei, Stuttgart (DE); Andrea Steiger-Pischke, Weissach (DE); Christian Schwientek, Neckarsulm (DE); Marko Poljansek, Reutlingen (DE); Wolfgang Hermsen, Kirchheim (DE); Markus Paeulgen, Esslingen/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/169,445
(22) PCT Filed: Nov. 17, 2000
(86) PCT No.: PCT/DE00/04043
§ 371 (c)(1),
(2), (4) Date: Nov. 8, 2002
(87) PCT Pub. No.: WO01/50039
PCT Pub. Date: Jul. 12, 2001

(30) Foreign Application Priority Data

Dec. 29, 1999 (DE) ........................................ 199 63 468

(51) Int. Cl.[7] ............................................. G06F 17/00
(52) U.S. Cl. .............................. 701/53; 701/1; 701/36; 701/51; 701/68; 701/84; 477/73; 477/74; 477/166
(58) Field of Search ................................ 701/1, 51, 53, 701/54, 55, 36, 102, 22, 58, 60, 84, 87, 68; 123/350; 477/166, 175

(56) References Cited

U.S. PATENT DOCUMENTS 4,590,568 A * 5/1986 Barske et al. ................ 701/93
5,467,277 A 11/1995 Sakamoto et al. ............ 701/51
5,832,401 A 11/1998 Ueda et al. .................... 701/55
6,162,146 A * 12/2000 Hoefling ........................ 477/73

FOREIGN PATENT DOCUMENTS

| DE | 38 02 241 | 8/1989 |
| DE | 2 775 749 | 9/1999 |
| FR | 0 950 839 | 10/1999 |
| WO | WO 97 01051 | 1/1997 |

OTHER PUBLICATIONS

Bauknecht et al., Das neue 5–Gang–Automatikgetriebe ... [The New 5–Speed Automatic Transmission ... ] from Automobiltechnischen Zeitschrift [Automobile Technology Magazine] 98 of 1996, pp. 508 to 519.

* cited by examiner

Primary Examiner—Gertrude A. Jeanglaude
(74) Attorney, Agent, or Firm—Kenyon & Kenyon

(57) ABSTRACT

A method and device are described for controlling an element of a drive train, which is influenceable by an operating device, in a vehicle having a control unit and a storage device, the element and/or the operating device being implementable in different variants. In this case, at least one identifier is stored in the storage device, the identifier representing the respective variant of the element and/or of the operating element which is contained in the vehicle. The element is controlled by the control unit as a function of the respective identifier in accordance with the respective variant. At the same time, different states of the respective variant of the element are selected, in particular through the operating means, an identifier being assigned for each possible state. The respective identifier contains control information, and the control unit analyzes the control information of the identifier and controls the respective variant of the element in accordance with the analysis of the control information.

9 Claims, 4 Drawing Sheets

T1 NORMAL:

| KL | AD | FT | SS |
|---|---|---|---|
| 0 | 1 | 0 | 1 |
| 0 | 1 | 0 | 1 |
| 0 | 1 | 0 | 1 |
| 99 | 1 | 0 | 0 |
| 99 | 1 | 0 | 2 |
| 99 | 1 | 0 | 2 |
| 99 | 1 | 0 | 2 |

T2 SPORT:

| KL | AD | FT | SS |
|---|---|---|---|
| 0 | 2 | 2 | 1 |
| 0 | 2 | 2 | 1 |
| 0 | 2 | 2 | 1 |
| 3 | 2 | 2 | 4 |
| 3 | 2 | 2 | 2 |
| 3 | 2 | 2 | 2 |
| 3 | 2 | 2 | 2 |

T3 WINTER:

| KL | AD | FT | SS |
|---|---|---|---|
| 0 | 0 | 0 | 1 |
| 0 | 0 | 0 | 1 |
| 0 | 0 | 0 | 1 |
| 7 | 0 | 0 | 3 |
| 7 | 0 | 0 | 2 |
| 7 | 0 | 0 | 2 |
| 7 | 0 | 0 | 2 |

METHOD FOR CONTROLLING AN ELEMENT OF A DRIVE TRAIN OF A VEHICLE AND CONTROL UNIT FOR PERFORMING SAID METHOD

FIELD OF THE INVENTION

The present invention relates to a method for controlling an element of a drive train, which is influenceable by an operating device, in a vehicle, and a control unit for carrying out the method.

BACKGROUND INFORMATION

German Published Patent Application No. 38 02 241 discloses an electronic controller for motor vehicles which includes a control unit, a program memory, a data memory, and an input/output unit having multiple input and output channels. In this case, the basic configuration may be laid out for multiple different individual embodiment variations simultaneously. This basic configuration is assigned a code memory for at least one code word to determine the respective individual embodiment variants. At the time of installation into the vehicle, or even later, the specific code word for the vehicle equipment variant is input into the code memory in order to thus control and/or enable the appropriate special controller embodiment. The associated program sections, data sets, and input or output channels are controllable as a function of the respective content of the code memory. In this case, the controller variant corresponding to the respective vehicle type is thus permanently established by inputting the code word into the code memory. In the event of a subsequent change, e.g., installation of additional components, these new components may be taken into consideration by a new code word, if it was already provided. However, the corresponding one variant is then fixed for the running operation of the vehicle.

In addition, many types of control variants for elements of the drive train, such as motor, clutch, and transmission, are known. Thus, the article "Das neue 5-Gang-Automatikgetriebe . . . [The New 5-Speed Automatic Transmission . . . ]" from Automobiltechnischen Zeitschrift [Automobile Technology Magazine] 98 of 1996, pp. 508 to 519, describes an electronic transmission control in which different types of operation are detectable and selectable by, on the one hand, a transmission control panel and, on the other hand, by an automatic transmission. In this case, however, the hardware such as the controller and/or transmission control panel is very inflexibly linked to the associated control programs, in that every combination of transmission control panel, controller, and control program is tuned separately.

It may therefore be seen that the related art is not capable of providing optimum results in every respect.

SUMMARY OF THE INVENTION

The present invention describes a method and a control unit for controlling an element of a drive train, which is influenceable by an operating device, in a vehicle having a control unit and a storage device, the element and/or the operating device being implementable in different variants. In this case, at least one identifier is stored in the storage device, the identifier representing the respective variant of the element and/or the operating device which is contained in the vehicle. The element of the drive train is controlled by the control unit as a function of the respective identifier in accordance with the respective variant, different states of the respective variant of the element advantageously being selected and an identifier being assigned to each possible state, the respective identifier containing control information, the control unit analyzing the control information of the identifier, and the respective variant of the element being controlled by the control unit in accordance with the analysis of the control information.

Therefore, in particular during operation, an identifier is expediently made available for every state which the element assumes or will assume.

Since the control is carried out as a function of the control information in the identifier, it is advantageously decoupled from the underlying hardware.

Therefore, the control programs and/or control data may be drawn up as a superset independently of a concrete element structure and/or drive train structure, in particular the structure of the transmission and/or transmission control panel, only the states and state transitions to be implemented being taken into consideration, independently from the hardware, and therefore any desired arrangements, in particular of the drive train and/or transmission and of the transmission control panel, being suitable for use as its basis.

Advantageously, each state is applicably assigned a value tuple, which contains all information, i.e., control information, for the various parts of the software, even specifically for a prioritization method in regard to the control requirements. These parts of the software and/or the corresponding control system expediently only access the value tuple (control information in the identifiers) for their calculations and/or tests, without taking cognizance of the actual raw information, in particular of the control panel, in particular of a transmission control panel.

Therefore, a large multiplicity of variants may advantageously be operated using the same control software and/or the same control system, the design and/or variant of the arrangement, in particular of the transmission control panel, not playing any role. The inputs may then expediently be performed via, for example, an onboard communication computer, each valid input state being assigned a value tuple (control information).

In the event of a subsequent modification of the arrangement, in particular of the transmission control panel, only the associated part of the program has to be adjusted and all other program and/or software parts remain unchanged. The adjustment is expediently performed by adjusting the control information and/or its content, i.e., the tuple values.

BRIEF DESCRIPTION OF THE DRAWINGS

FIG. 3 shows tables for establishing the state having the contained identifiers and control information.

DETAILED DESCRIPTION

In the following, the present invention is described with reference to exemplary embodiments.

Figure 1:
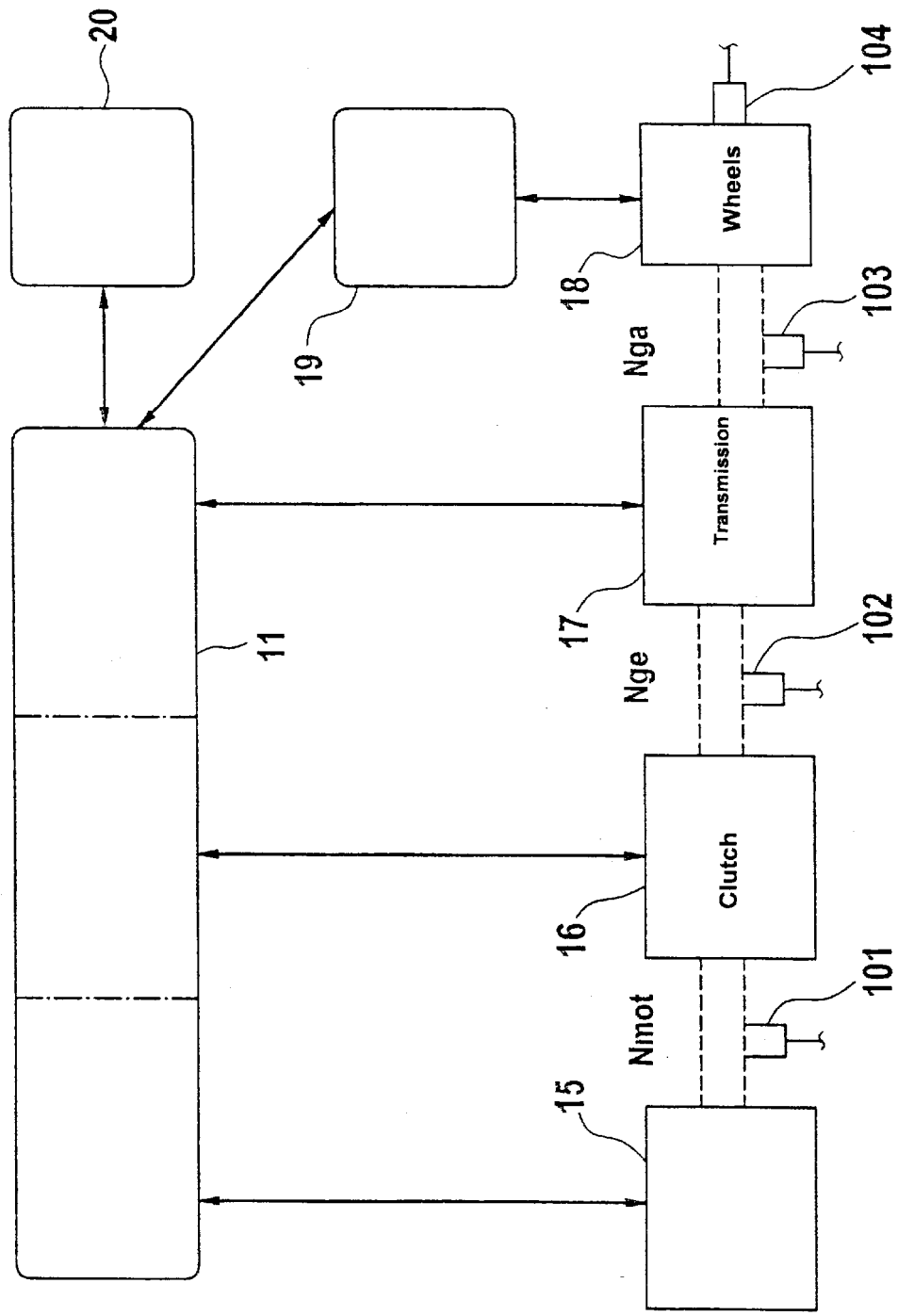
FIG. 1 shows an overview block diagram of a drive train having an associated sensor system and the controller according to the present invention.

In FIG. 1, a drive, in particular an internal combustion engine, is indicated using 15. Drive 15 is connected here to drive wheels 18 of the vehicle via a clutch 16, which may in particular be a main clutch and/or torque converter clutch, and a transmission 17. In this case, transmission 17 may also be connected downstream from clutch 16. Transmission 17 is, for example, a continuously variable transmission (CVT) ratio. Drive 15, clutch 16, and transmission 17 are controlled by appropriate control systems, which are combined in block 11. In this case, as indicated by the dot-dash lines, the drive control system, the clutch and converter control system, and the transmission control system may be implemented separately, or the control of the drive train may be performed centrally as a coordinated control of drive, clutch and/or converter, and transmission. Furthermore, at least the detection of engine speed Nmot using a sensor 101 and of transmission input speed Nge using sensor 102 are provided. The transmission ratio is adjustable within a wide range, in particular in CVT transmissions. Through a transmission control panel 20, the driver may generally select between position N (neutral), position P (park setting), and position D (drive gear). If the driver selects position N (neutral), clutch 16 is opened and the power flow in the drive train is essentially interrupted. In the neutral setting, a slight power flow may still be provided for reasons of safety. Furthermore, transmission output speed Nga, which corresponds to the vehicle speed, may be detected via sensor 103. Transmission output speed Nga is supplied to drive train control system 11, as are transmission input speed Nge and engine speed Nmot. Control system 11 also receives inputs from transmission control panel 20 and further control units 19, in particular a control unit for influencing the braking effect and/or regulating the driving stability and/or safety of the vehicle. On its part, such a braking effect control system 19 receives, for example, the wheel speed, detectable using wheel speed sensor system 104, or a possible gear torque.

The sensor variables, variables of an operating element 20, in particular of a transmission control panel, and variables of further control units 19, as well as further variables which are not illustrated, are supplied to control system or control unit 11. As a function of these signals, control system 11 forms setpoints and/or manipulated variables for an integrated engine control system, a clutch and/or converter control system, and a transmission control system. These control systems and/or control system 11 in turn supply actuating signals to the corresponding actuators of drive 15, clutch 16, and transmission 17. Through the control system, actuators and switching elements carry out the desired conversion effects. The actuation of the actuators is performed directly by the driver or automatically with the aid of sensors, whose signals are further processed in a hydraulic or electronic controller according to a predefined program.

In the following, the control of transmission 17 by control unit 11 is described in particular. For this purpose, variables such as transmission output speed, load condition, and speed of the drive are detected by sensors. The selection lever position and the setting of the program and kickdown switch, as well as further variables of other controllers, are also included in this case. Controller 11 processes this information according to predefined programs and determines the variables to be output to the transmission therefrom. Thus, transmission control panel 20 typically includes a selection lever, which locks solidly into multiple positions, and a restricted number of pushbuttons or switches. In this case, an instantaneous state of the transmission control panel results at each instant from the set of all valid combinations (selection lever, pushbutton, and time response). This instantaneous state of the transmission control panel and the further information previously described finally determine an operating state at a specific instant. The transmission control panel therefore includes, besides the selection lever, switches and/or pushbuttons which are to influence the driving behavior. Typical examples of these are winter/sport pushbuttons/switches and the manual positioning of the selection lever and possibly an economy function. In this case, a large multiplicity of variants may be produced via various projects, which result from differing numbers of operating elements and the embodiments of the operating elements.

The control programs and/or control data for determining the optimum transmission ratio of an automatic transmission are, due to differing requirements, which are sometimes contradictory (e.g., desire for saving gasoline in contrast to desire for higher torque reserve), composed of multiple parts, which each attempt to deal with a requirement. A final result is determined from all of the requirements using a prioritization method.

Each state selectable by the input variables in control unit 11 is applicably assigned an identifier. I.e., not only does a static variant for a special transmission arrangement and/or drive train arrangement exist, but rather different states are also differentiated within the same arrangement, these states also being each assigned an identifier which contains the control information and also the information for prioritizing the requirements. For the control system, only the identifier and/or the control information contained in the identifiers is accessed, without taking cognizance of the actual raw information of the transmission control panel or the other input signals.

Figure 2:
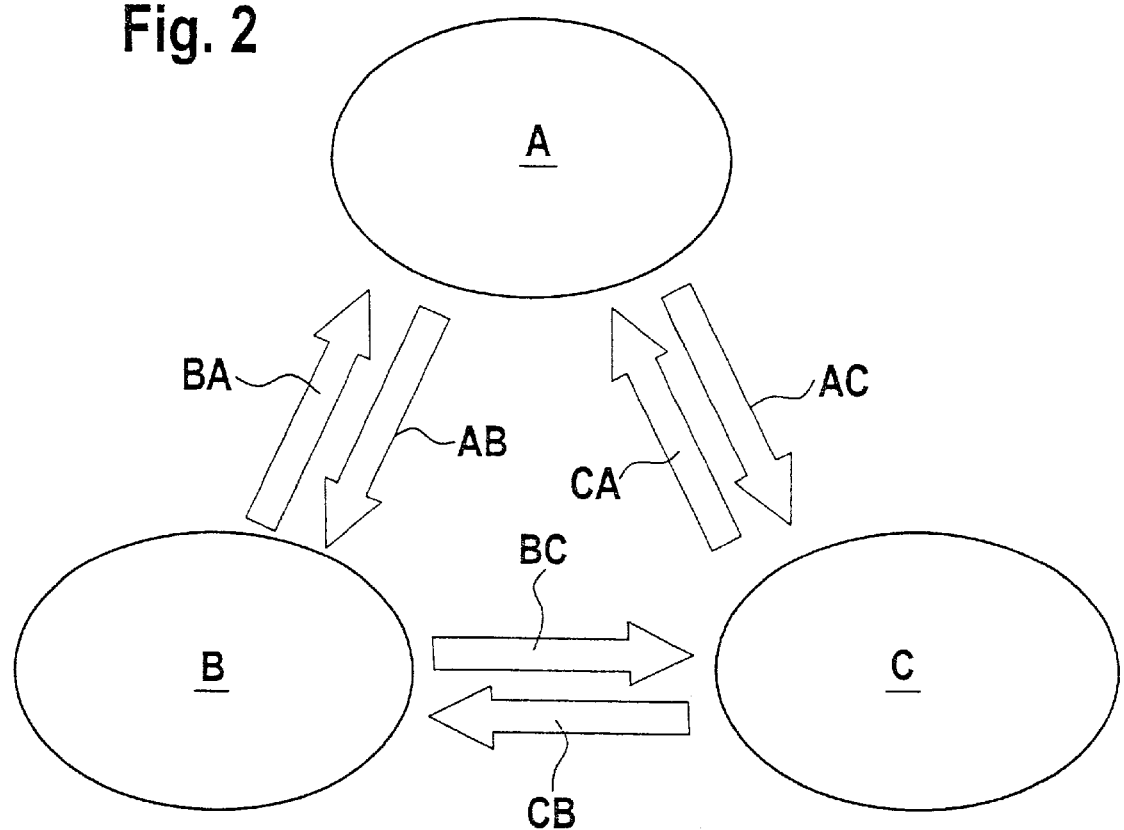
FIG. 2 illustrates examples of states and state transitions of the present invention.

In this case, FIG. 2 generically shows a state illustration having the associated state transitions. In an exemplary embodiment, state A may, for example, correspond to neutral. This means that, for example, the transmission control panel would assume control setting N. From this state, one may transit to state C through state transition AC. State C is, for example, a special winter tuning. Transition AC may be performed either by the driver through operating elements or it may be triggered by the temperature sensor system or a driving stability detector via information from sensors or further controllers, for example, in the case of winter operation. In the same way, a neutral state, state A also in this case, may be transited to through state transition CA from a winter state, again through external information or the transmission control panel.

Further states, such as B, e.g., a sport state, are also conceivable. In this case, the sport state may be changed into from the neutral state, i.e., in particular, neutral setting N of the transmission control panel, using state transition AB. The sport state of the transmission and/or drive train may again be triggered in this case by either operating elements of the transmission control panel, in particular a program selection switch or a sport pushbutton, or, for example, a driver type detection of an automatic transmission. The trigger for state transition AB may also be a driver type detection through analysis of, for example, the accelerator pedal by the drive control. If very sporty driving behavior is recognized, the state transition into the sport state, B in this case, is performed. Just as with the winter state, a neutral state A may be returned to from sport state B using state transition BA. This may again take place by actuating an operating element, for example switching off a sport pushbutton, moving the selection lever into the neutral position, etc. Further state transitions BC and CB of the sport state into the winter state and vice versa are also conceivable. For reasons of clarity, the illustration is limited to three states in this case. Furthermore, a normal driving state (definable as default), driving using limitations, an economy state, an off-road state, etc., would be conceivable.

In FIG. 3, a pushbutton combination having specific selection lever values is illustrated as an example. Thus, the operating element inputs, in particular, pushbuttons and/or switches, and/or state inputs for sport and winter exist and, if neither of these two is applied, normal. Table 1 T1, Table 2 T2, and Table 3 T3 are illustrated. Assignment Table ZT contains selection lever positions P for park setting, R for reverse, N for neutral, D for driving operation, and limits 3, 2, 1 as examples. Therefore a 7*3 matrix may be drawn up in this exemplary embodiment, in which 21 different responses, i.e., 21 different identifiers, may be stored. The states previously mentioned are therefore each represented by an identifier. For identical identifiers, the associated inputs may be combined into one state. For example, positions P, R, N of the selection lever, without a sport or winter setting being provided in this example, i.e., in normal operation, could be combined in Table 1 T1 into one state. For the settings 1, 2, 3 and/or 2, 3, 4 and/or 2, 3, 4, 5, etc. of the transmission control panel, i.e., a limiting or gear restriction, there are three possibilities: either precisely the indicated gear is to be engaged, which may lead to an upshift or shift block in the event of a gear determination, or the gear set corresponding to the indicated gear is to be maintained, which may lead to a downshift or shift block. Furthermore, the gear set is not to be abandoned in accordance with the indicated gear; however, if a higher gear is applied, it is accepted, which may lead to a shift block. The decision as to which of the three possibilities exists may also be made via the method according to the present invention in the operating element and is applicable.

In order to raise the differences in regard to control system, drive train, and/or control panel, in particular transmission control panel, to a shared abstract plane without excluding possible combinations, the control information contained in the identifiers for controlling the drive train, in particular the transmission, is analyzed. Specifically, each entry of the matrix, i.e., each identifier, includes, for example, the following components: characteristic KL, adaptation and/or adaptation method AD, driver type FT, and shift situation SS. Therefore, applied and/or applicable information, i.e., control information, is made available which is a function of the instantaneous state of the transmission control panel and/or of the drive train, in particular of the transmission. In this case, characteristic information KL contains identifications for all possible shift characteristics of the transmission. These may be shift characteristics for economic operation, mountain operation, sporty driving, rally or off-road, winter operation, warming up, cornering, comfort, a sport-mountain matrix, shift characteristics for ACC operation, for trailer operation, etc.

An identification as control information, for example, 99, allows no fixed selecting characteristic to be used. In the example in FIG. 3, for example, characteristic 3 is provided for sport operation and a characteristic 7 is provided for winter operation, while in contrast in normal operation, i.e., Table T1, no fixed selected characteristic (99) exists, but rather is selectable during operation. For example, in general a shift characteristic 0 is provided for selection lever settings P, R, N.

The following information relates to the adaptation, i.e., the adaptation method. In this case one may, for example, differentiate between non-adapting 0, economically adapting 1, sportily adapting 2, and off-road adapting 4, which are assignable to the individual states.

In addition to a differentiated driver type recognition, for example, by analyzing the accelerator pedal, a basic driver type FT is selectable in the identifier for each state. For example, various basic types 1 to 5, sporty, economic, comfort-conscious, etc., are differentiated, an entry 0 of the input corresponding to no basic driver type, for example, i.e., no basic type is selected.

The last information here of the identifier, shift situation SS, indicates specific shift situations, triggered, for example, via the transmission control panel. A 0 entry indicates that, for example, no specific shift situation is selected. In addition, using 1, for example, a separate shift situation P, R, N may be selected corresponding to the selection lever settings, using 2 a representation of the limiting operation, i.e., the settings 3, 2, 1 from ZT in this case, using 3, for example, the winter shift situation, and using 4, for example, the sport shift situation. Further shift situations, such as warming up, emergency operation, mountain, or cornering, in particular those which may not be triggered by the transmission control panel, may be indicated using 5, 6, 7, etc. in this case. The prioritization method may thus access the identification of the individual shift situations and, for example, prioritize the different requirements according to an assignment table.

In one embodiment, it would also be conceivable to record fixed and/or selectable prioritizations of individual requirements and/or of the state trigger signals directly in the control information and thus make them directly analyzable.

By introducing the states and the identifiers assigned thereto and the control information contained therein, only the control information itself is accessed by the control program, due to which this hardware may be designed as independent. Therefore, only the control information of the identifiers is accessed for the calculations, without the actual raw information, for example from the transmission control panel, being taken cognizance of. Therefore, the identifiers and the information contained therein are switched over during the running operation of the control system according to the possible states and state transitions and the appropriate, unequivocal control information is accessed, this control information, i.e., KL, AD, FT, SS, being fixed over all variants of the arrangements of the drive train and/or the transmission control panel (cf. FIG. 1) and being accessed afterward independently from the respective arrangement.

Figure 4:
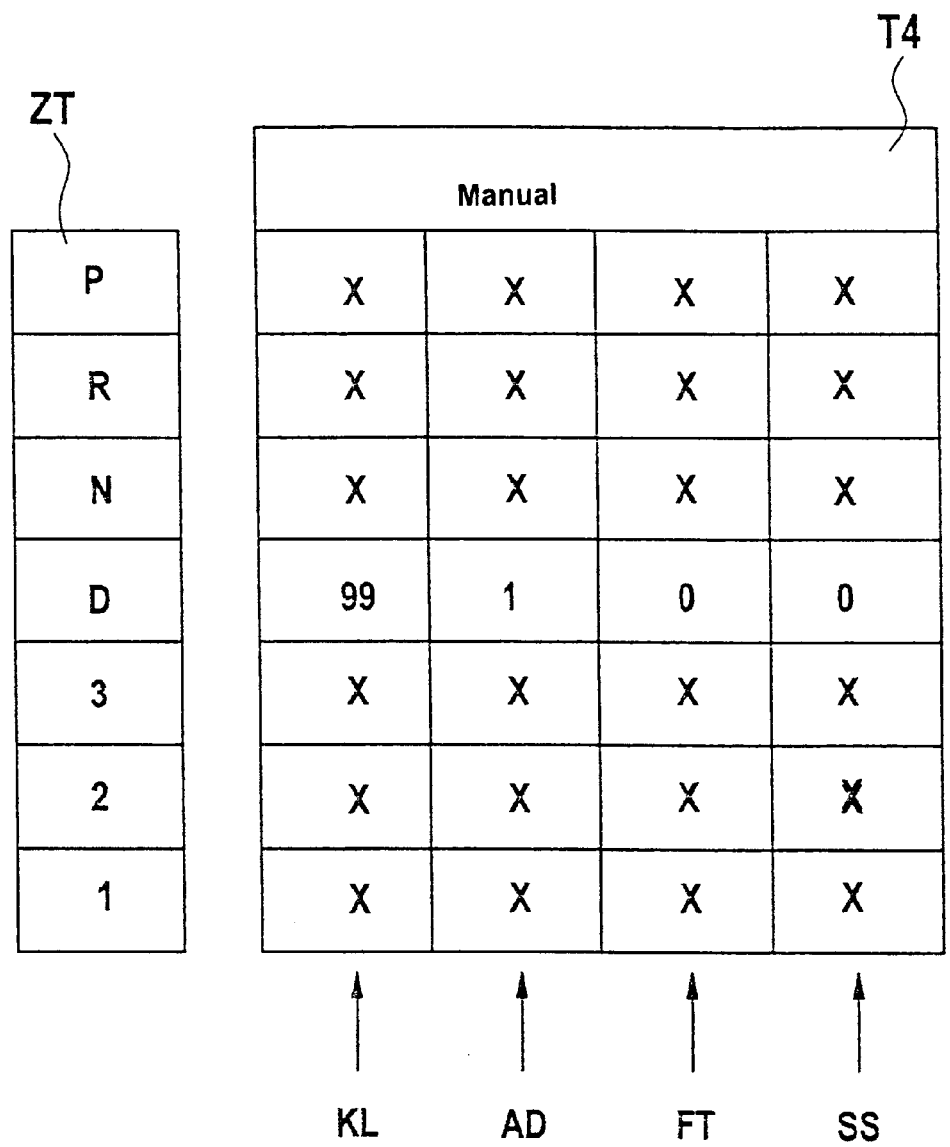
FIG. 4 shows a further table as a supplement and to explain further exemplary embodiments.

In FIG. 4, a further option "manual" is illustrated in Table T4. In this case, for example, the selection lever was pushed into a channel and selection may now be performed manually via pushbuttons. As selected in Table 4, this is in particular only allowed in normal driving operation D. This behavior, which is also known under the name Tipptronic, may also be controlled by the method of the states and state transitions via assigned identifiers. In this case, no special characteristic is fixed as a characteristic; for example, economic adaptation is used, with, furthermore, no basic driver type and no specific shift situation being selected. This Table T4 may be added to the tables from FIG. 3 or it may replace individual tables. Like Table T4, further tables, for example an economic table, rally, or off-road table, all-wheel drive table, comfort table, or, comparable with the Tipptronic, a Hypertronic having gear simulations etc., would be conceivable as a matrix component.

According to the present invention, therefore, the control information of the identifier of the states is analyzed independently of how one reached the respective state.

Due to the multiplicity of the possible variants and the states resulting therefrom, it is further advisable to reduce these variants. On the one hand, this is achieved as described above by combining identical identifiers into the same state. This reduction of variants is advisable if supersets are formed by forming matrices for the control panel and the states. In order to keep these supersets as small as possible, other possibilities for variant reduction may be used.

One possibility is to, for example, define the state change initiated by the transmission control panel as applicable using machine tables. In this case, all states which are to be reached through external signals, in particular the transmission control panel, are coded. Thus, for example, the neutral state represented by selection lever positions P, R, and N in normal operation receives coding 0. Sport state 1, winter state 2 and a possible manual state 3 are binary codable in 2 bit. The instantaneous state of the elements of the transmission control panel, i.e., the operating elements, in particular the pushbuttons/switches, and the state of the last cycle are used.

Thus, the sport pushbutton having instantaneous state S (0) and preceding state S(−1).

The winter pushbutton having W(0) and W(−1) and the manual pushbutton having M(0) and M(−1).

The instantaneous state which results from the preceding operations of the pushbuttons or the external signals, for example, through sensors or a further controller, are established using a state machine. After a restart or reset, the machine is in the neutral state. Depending on the external input signal, it switches into the states corresponding to FIG. 2. In order to establish new instantaneous state STA(0), combined input signal EIN for the machine table is generated from last state STA(−1) and instantaneous input signal states S(0), W(0), M(0).

| Bit | 7 6 | 5 4 | 3 2 | 1 0 |
|---|---|---|---|---|
| EIN | STA(−1) | M(−1)M(0) | W(−1)W(0) | S(−1)S(0) |

Therefore, 256 different combinations theoretically result for input signal EIN in this example. An output value AUS is now fixed for all combinations in an applicable table, which is now interpreted as following.

| Bit | 7 | 6 | 5 | 4 | 3 | 2 | 1 | 0 |
|---|---|---|---|---|---|---|---|---|
| AUS | — | — | — | STA(0) | | M(R) | W(R) | S(R) |

New state STA(0) is represented here by bits 3 and 4 and the erasing of the preceding signals by reset, i.e., M(R), W(R), S(R) (using R as in reset). Therefore, all state transitions through the operation of the transmission control panel, as well as external signals, are completely applicable.

In order to now obtain, in spite of the great multiplicity of variants, software, i.e., control program and/or data, which is as reusable as possible, a multiply instantiable class is introduced as a switch/pushbutton software object. This class is disengaged from the real operating elements and constitutes an object which represents them. A real operating element represents one instance of this class, the type (switch or pushbutton) able to be set via an application switch (in hardware or software). The adjustment of the transmission control panel to a project may therefore be performed very easily through the (multiple) instancing of the switch/pushbutton class (implementation of different numbers of operating elements) and application of the objects (implementation of switch or pushbutton). Therefore, no duplication of code blocks is necessary in the event the number of operating elements is changed and no recoding is necessary if the operating element type (switch/pushbutton) is changed. The switch/pushbutton class is implemented in this case in such a way that it executes an internal state machine on the basis of the hardware signal detected, and the remaining software may query via a method whether the respective switch/pushbutton is in an active or inactive state. In addition, it is often desirable not only to be able to change the state of the pushbutton by actuating the real pushbutton, but also to be able to reset through the software. This feature is also supported by the switch/pushbutton class through a corresponding method interface, if the object concerned is applied as a pushbutton. For switches, this function is, naturally, not supported. For the software used, it is transparent whether an instance of the switch/pushbutton class is applied as a switch or pushbutton, since the method interface remains unchanged. In the event the operating element type is changed, a software change in the software applied is therefore not absolutely necessary. Therefore, for example, a reset request on a switch of the switch/pushbutton class is simply ignored, while it is executed for a pushbutton.

What is claim is:

1. A method of controlling an element of a drive train that is influenceable by an operating device in a vehicle including a control unit and a storage device, at least one of the element and the operating device being implementable in different variants, the method comprising:

storing at least one identifier in the storage device, the at least one identifier representing at least one of a variant of the element contained in the vehicle and a variant of the operating device contained in the vehicle;

causing the control unit to control the element as a function of the at least one identifier in accordance with the at least one of the variant of the element and the variant of the operating device;

causing the operating device to select different states of the variant of the element;

assigning another identifier to each of the different states, the other identifier containing control information;

causing the control unit to perform an analysis of the control information of the other identifier; and causing the control unit to control the variant of the element in accordance with the analysis of the control information.

2. The method according to claim 1, further comprising:

assigning each state a value tuple containing the control information.

3. The method according to claim 1, further comprising:

triggering at least one of a state and a change from one state into another state by one of a signal from the operating device, a sensor signal, and a signal of a further control unit.

4. The method according to claim 3, wherein:

the operating device includes a transmission control panel.

5. The method according to claim 1, further comprising:

selecting at least two states from the different states, the set of states including at least one neutral state, at least one winter state, at least one sport state, at least one economy state, at least one off-road state, at least one comfort state, at least one manual state, at least one normal driving state, and at least one limitation state.

6. The method according to claim 1, wherein:

the control information contains at least two items of information from an information set, the information set including characteristic information, driver type information, adaptation information, shift situation information, and prioritization information.

7. The method according to claim 1, further comprising:

performing a reduction of the number of states by at least one of combining identical ones of the at least one identifier and using a state table.

8. A device for controlling an element of a drive train that is influenceable by an operating device in a vehicle including a control unit and a storage device, at least one of the element and the operating device being implementable in different variants, the device comprising:

an arrangement for storing at least one identifier in the storage device, the at least one identifier representing at least one of a variant of the element contained in the vehicle and a variant of the operating device contained in the vehicle;

an arrangement for causing the control unit to control the element as a function of the at least one identifier in accordance with the at least one of the variant of the element and the variant of the operating device;

an arrangement for causing the operating device to select different states of the variant of the element;

an arrangement for assigning another identifier to each of the different states, the other identifier containing control information;

an arrangement for causing the control unit to perform an analysis of the control information of the other identifier; and an arrangement for causing the control unit to control the variant of the element in accordance with the analysis of the control information.

9. The device according to claim 8, further comprising:

an arrangement for assigning each state a value tuple containing the control information.

\* \* \* \* \*